US011671531B1

(12) United States Patent
Mudireddy et al.

(10) Patent No.: US 11,671,531 B1
(45) Date of Patent: Jun. 6, 2023

(54) TECHNIQUES FOR MANAGING COMMUNICATIONS BETWEEN DEVICES

(71) Applicant: Amazon Technologies, Inc., Seattle, WA (US)

(72) Inventors: Jagadesh Babu Mudireddy, Redmond, WA (US); Tapojoy Chatterjee, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 16/933,598

(22) Filed: Jul. 20, 2020

(51) Int. Cl.
*H04M 3/00* (2006.01)
*H04M 5/00* (2006.01)
*H04L 12/66* (2006.01)
*H04M 3/42* (2006.01)
*H04L 67/306* (2022.01)
*H04M 3/436* (2006.01)

(52) U.S. Cl.
CPC ...... *H04M 3/42059* (2013.01); *H04L 67/306* (2013.01); *H04M 3/436* (2013.01)

(58) Field of Classification Search
CPC ............... G06Q 30/02; G06Q 30/0277; G06Q 30/0241; G06Q 30/0251; G06Q 30/0217; G06Q 30/0257; G06Q 30/0269; G06Q 30/0601; G06Q 30/0242; G06Q 30/0271; G06Q 30/0276; G06Q 30/00; H04L 67/02; H04L 67/306; H04L 67/22; H04L 29/08675; H04L 29/08936; H04L 63/0421; H04M 1/72445; H04M 2215/0192; H04M 15/08; H04M 15/09; H04M 15/51; H04M 15/56; H04M 15/57

USPC .......... 705/14.39, 14.4, 14.54, 14.66, 14.55, 705/14.73, 14.16, 14.1, 14.19, 14.23, 705/14.49
See application file for complete search history.

(56) References Cited

U.S. PATENT DOCUMENTS

| 5,757,899 | A  | * | 5/1998 | Boulware | ............. | H04M 3/436 379/207.02 |
| 7,573,996 | B1 | * | 8/2009 | Somani | ............... | H04M 3/5231 379/210.01 |
| 7,796,747 | B1 | * | 9/2010 | McCormack | ....... | H04M 3/5233 709/204 |

(Continued)

*Primary Examiner* — Kharye Pope
(74) *Attorney, Agent, or Firm* — Kilpatrick Townsend & Stockton LLP

(57) ABSTRACT

Systems, devices, and methods are described herein for managing communications between a user and a third-party such that the confidentiality of the user's contact information is maintained. In some embodiments, the user may indicate interest in establishing contact with a third-party. In response, a service provider computer may obtain the user's contact information and transmit data different from that contact information to the third-party. Later, when the third-party wishes to establish contact, it may provide the data to the service provider computer. If the data received matches the data provided previously, the service provider computer may establish a communications channel between the user and the third-party. Establishing the communications channel may include forwarding a telephone call, merging multiple telephone calls, forwarding an email, or the like. Utilizing the techniques discussed herein, the confidentiality of the user's contact information may be maintained.

19 Claims, 9 Drawing Sheets

(56) References Cited

U.S. PATENT DOCUMENTS

| | | | |
|---|---|---|---|
| 2002/0138418 A1* | 9/2002 | Zarin | G06Q 30/0239 705/38 |
| 2003/0182229 A1* | 9/2003 | Siegel | G06Q 40/025 705/26.1 |
| 2005/0065980 A1* | 3/2005 | Hyatt | G06F 16/22 |
| 2006/0149630 A1* | 7/2006 | Elliott | G06Q 30/0267 705/14.64 |
| 2006/0184381 A1* | 8/2006 | Rice | G06Q 30/0601 705/26.1 |
| 2007/0127650 A1* | 6/2007 | Altberg | G06Q 30/0242 379/114.13 |
| 2007/0147349 A1* | 6/2007 | Bangor | H04M 3/42068 370/352 |
| 2008/0159500 A1* | 7/2008 | Wang | H04W 4/16 379/142.05 |
| 2009/0240538 A1* | 9/2009 | Sweeney | G06Q 30/0273 705/14.69 |
| 2009/0247140 A1* | 10/2009 | Gupta | G06Q 30/02 455/418 |
| 2009/0285378 A1* | 11/2009 | Poola | H04M 3/4931 379/201.11 |
| 2010/0222100 A1* | 9/2010 | Dragt | H04M 1/72403 455/557 |
| 2011/0078581 A1* | 3/2011 | Chervirala | G06Q 30/02 715/744 |
| 2011/0116618 A1* | 5/2011 | Zyarko | H04M 3/5158 379/266.07 |
| 2015/0154577 A1* | 6/2015 | Gargash | G06Q 30/0241 705/40 |
| 2016/0034953 A1* | 2/2016 | Wall | G06Q 10/107 705/14.53 |
| 2017/0116642 A1* | 4/2017 | Meyer | G06Q 30/0277 |
| 2018/0007199 A1* | 1/2018 | Quilici | H04M 3/436 |
| 2020/0027158 A1* | 1/2020 | Dommer | G06F 9/547 |
| 2020/0265467 A1* | 8/2020 | Gupta | G06Q 30/0271 |

\* cited by examiner

| Third-Party ID | User ID | Content ID | User Contact Info. | Encrypted Data | Restrictions | Access Code |
|---|---|---|---|---|---|---|
| Acme | User 1 | A10 | Name, Mobile Phone | LAJ3J10N | 1 Time | 198765 |
| Acme | User 1 | A521 | Name, Home Phone | 2239403 | 5 Times | 245613 |
| Acme | User 2 | A22 | Name, Mobile Phone, and Email | MF381K | 14 Days | 456178 |
| Zeta | User 1 | Z9012 | Email | 12IMNS8 | 5 Days | 116458 |
| Delta | User 1 | D2 | Name, Business Phone, and Email | PLS9383M | 1 Time | 234415 |
| Beta | User 3 | B11 | Name, Email | NAL21099 | 1 Time | 974184 |

302

| Third-Party ID | User Contact Information | Restrictions | Access Code |
|---|---|---|---|
| Acme | Name, Mobile Phone | 1 Time | 16497 |
| Beta | Name, Home Phone | 5 Times | 24681 |
| Zeta | Email | 5 Days | Aic-231 |
| Delta | Name, Business Phone and Email | 1 Time | 5A1A42 |
| Epsilon | Name, Mobile Phone and Email | 5 Days | JKL549 |
| Omega | Mobile Phone and Email | 1 Hour | AMKJIL |

TECHNIQUES FOR MANAGING COMMUNICATIONS BETWEEN DEVICES

BACKGROUND

Third-party providers often offer content to users at websites of an electronic marketplace. If a user wished to learn more about the content, he could opt to provide the third-party provider his contact information. The transfer of this information was often managed by a service provider of the electronic marketplace. However, once the third-party provider was in possession of the user's contact information, little could be done to prevent mismanagement of that information.

BRIEF DESCRIPTION OF THE DRAWINGS

Various embodiments in accordance with the present disclosure will be described with reference to the drawings, in which:

FIG. 3 illustrates two tables depicting two example mappings that may be utilized to maintain data for managing communications between a user device and a third-party device, in accordance with at least one embodiment;

DETAILED DESCRIPTION

Figure 1:
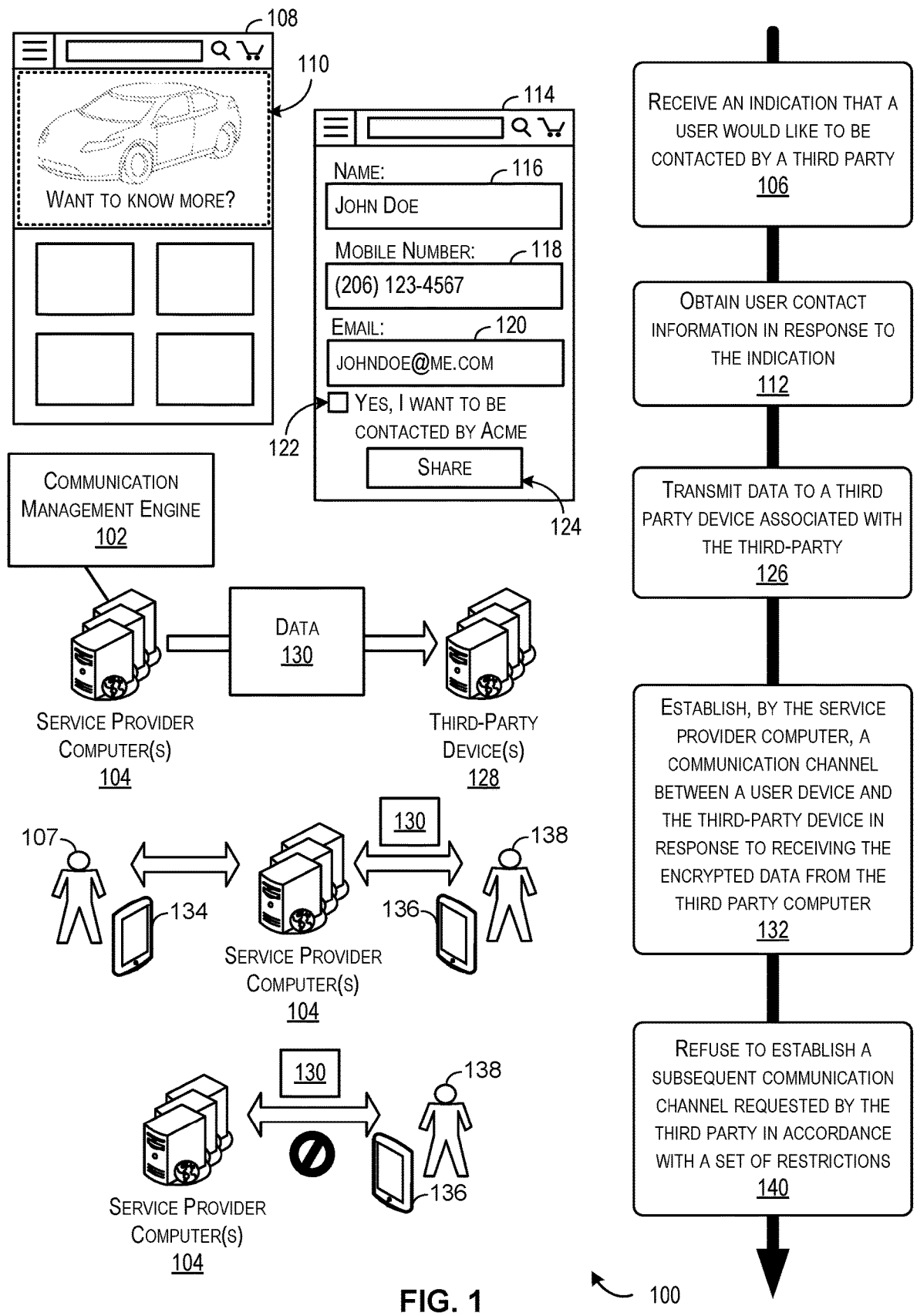
FIG. 1 illustrates an example flow for establishing a communication channel between a user device and a third-party device utilizing a communications management engine operating at a service provider computer, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to managing communications between a user and a third-party while maintaining the confidentiality of the user's contact information. In some embodiments, content (e.g., an advertisement or other electronic information) may be provided via a webpage (e.g., a webpage of an online retailer website where goods and services are bought and sold), email, or any suitable user interface. In response to selecting the content (e.g., clicking on an advertisement, selecting a hyperlink, etc.), a user may be provided (e.g., by a communications management engine) an interface for providing contact information. For example, webpage and/or a popup may be provided to obtain any suitable combination of the user's contact information (e.g., name, email address/addresses, phone number(s), physical address/addresses, etc.). In some embodiments, this interface may be prepopulated with the user's contact information as obtained from a user profile (e.g., a user profile associated with the online retailer website, etc.). If the user affirms his desire to share his contact information, data may be generated and associated with any suitable combination of the user, the third-party, and/or the content. In some embodiments, the data may be generated based at least in part on the contact information (e.g., the data may be generated by encrypting at least a portion of the user's contact information). By way of example, the data may include the user's name and an encrypted version of the user's contact information (e.g., an encrypted version of the user's email address, an encrypted version of the user's phone number, encrypted version(s) of the user's email address and phone number as combined or separate, etc.). This data is different from the user's contact information. Once generated, the data may be transmitted to a third-party device.

Later, the third-party may wish to contact the user. If so, a third-party device may transmit to the communications management engine a contact request to contact the user. In some embodiments, the contact request may be provided in the form of an email and/or a telephone call. The third-party may provide the data that was previously received by the communications management engine (e.g., the user's name and an encrypted version of the user's email address if that was the data received by the third-party). The communications management engine may utilize the data received to verify the identity of the third-party and/or to obtain the contact information corresponding to the user. In some embodiments, the communications management engine may establish a communications channel between the user and the third-party. By way of example, establishing a communications channel may include any suitable combination of forwarding an email, forwarding a telephone call, and/or merging multiple telephone calls.

By utilizing the techniques provided herein, the user and third-party may communicate with one another even though the third party is never provided the user's contact information, rather the third party is provided an access code such that the user's contact information remains confidential. This is in direct contrast to previous systems that provided the user's contact information to a third party. The user may rest assured that the confidentiality of his contact information is maintained and may be provided the ability to revoke the third-party's ability to contact him. This increases the security associated with the user's personal information.

Similar techniques may be utilized in other contexts. For example, a service provider (e.g., a provider of the communications management engine) may provide an interface for indicating that a user would like a call-back (e.g., generally, regarding a certain topic and/or item, etc.). The interface may be provided at a webpage associated with a business. If the user interacts with the interface, the business may be provided (e.g., by the communications management engine) the ability to contact the user without being provided the user's contact information. Subsequent communications may be managed by the communications management engine according to a set of predefined and/or user-defined restrictions such that the business may not harass the user and/or to promote timely communication.

At least some aspects of the disclosed techniques include gathering and the user of personal data. The personal data, in some instances, may uniquely identify or can be used to identify a specific person. This information can include telephone numbers, email addresses, home addresses, or the like. It can be appreciated that the use of this information can benefit users such that a trusted parties (e.g., a service provider of an online retailer website) can manage third-party contacts on behalf of the user. It can be appreciated that trusted parties that gather this information will comply with well-established privacy policies. Personal data will be gathered for legitimate purposes only after receiving the consent of the user(s) or upon another legitimate basis specified by applicable law. It is contemplated that, in some embodiments, a user may selectively block the use of, or access to, their personal data. In some embodiments, the foregoing techniques may be utilized only after the users have opted in to the participation of the collection of their personal data generally, or specifically for the purposes disclosed herein.

Moving on to FIG. 1 which illustrates an example flow 100 for establishing a communication channel between a user device and a third-party device utilizing a communications management engine (e.g., communications management engine 102) operating at a service provider computer (e.g., the service provider computer(s) 104), in accordance with at least one embodiment.

The flow 100 may begin at 106, where an indication that a user 107 would like to be contacted by a third party may be received. By way of example, a user interface 108 may be provided (e.g., via a webpage). In some embodiments, the user interface 108 may be provided as part of an electronic marketplace, although the user interface 108 may be similarly provided via other webpages that may or may not be provided as part of an electronic marketplace. In some embodiments, the user interface 108 may include content 110. As a non-limiting example, the content 110 may include an advertisement for good(s) and/or service(s), although the content 110 need not necessarily include an advertisement.

At 112, user contact information may be obtained (e.g., in response to receiving the indication at 106). By way of example, in some embodiments, when the user selects the content 110 (e.g., with an input device such as a mouse or touch screen), user interface 114 may be presented (e.g., via a different webpage, via a popup window, etc.). In some embodiments, user interface 114 may include any suitable interface elements (e.g., text boxes, edit boxes, check boxes, radio buttons, etc.) for providing any suitable combination of contact information. As depicted, user interface 114 includes name field 116 for submitting the user's name, mobile number field 118 for submitting the user's mobile number, and email field 120 for submitting the user's email address. In some embodiments, fields 116-120 may be prepopulated with corresponding user profile data previously collected from the user (e.g., from a user profile associated with the electronic marketplace). The fields 116-120 may be editable such that the user may enter and/or modify the contents of fields 116-120. In some embodiments, the user interface 114 may include checkbox 122 with which the user may affirm their desire to be contacted by the third-party provided of the content 110. Once any suitable combination of the fields 116-120 are populated and the checkbox 122 is checked (if present), the user may select user interface element 124 to submit their contact request. It should be appreciated that the user interface 114 may be differently configured and/or formatted with the same or different interface elements as those depicted in FIG. 1.

At 126, data 130 (e.g., any suitable data associated with the content, third-party, user, contact request, etc.) the may be transmitted to a third-party device (e.g., third-party device(s) 128) associated with the third party (e.g., the third party by which the user would like to be contacted). In some embodiments, at least a portion of the data 130 may include encrypted data. By way of example, the data 130 may be obtained/generated by the service provider computer(s) 104 by encrypting any suitable portion and/or combination of the user's contact information. However the data 130 is obtained and/or generated, the data is different from the user's contact information. In some embodiments, prior to transmission, the service provider computer(s) 104 may store the data 130 in memory. This data may be associated with an identifier of the user 107 and/or an identifier of the third party and/or an identifier of the content 110. In some embodiments, this data may be associated with a set of restrictions for contacting the user. Some example contact protocols and storage schemes are discussed in more detail with respect to the figures below.

At 132, the service provider computer(s) 104 may establish a communications channel between a user device 134 associated with the user 107 and third-party device 136 associated with a third party (e.g., the user 138, the provider of the content 110, an agent of the provider of content 110, etc.). The communications channel may be established in response to receiving the data transmitted at 126 (e.g., the data 130). In some embodiments, establishing the communications channel may include forwarding an email, forwarding a telephone call, and/or merging multiple telephone calls. By way of example, the user 138 may send an email via the third-party device 136 to the service provider computer(s) 104 including the data 130. The email may further include a message for the user 107. The service provider computer(s) 104 may obtain the data 130 from the email and compare it to the data 130 transmitted at 126 and associated with the user 107, the third party, and/or the content 110. If the data 130 received matches the data originally provided (e.g., data associated with the user 107, the third party, and/or the content 110, etc.), the service provider computer(s) 104 may be configured to forward the email to the user 107 using the email address obtained from the user's contact information. The user 107 may then receive the email via the user device 134.

As another non-limiting example, the third party (e.g., user 138) may place a call to the service provider computer(s) 104. When connected, the user 138 may provide the data transmitted at 126 (e.g., encrypted data, an alphanumeric code, a content identifier). If the data provided by the user 138 matches the data provided at 126 which is associated with the user 107 (and potentially the content 110), the service provider computer(s) 104 may be configured to forward the telephone call established with the user 138 to the user device 134 (e.g., a cell phone of the user 107).

At 142, the service provider computer(s) 104 may refuse to establish a subsequent communications channel requested by a third party (e.g., the user 138). In some embodiments, by default, the third party may be afforded the ability to contact the user via the service provider computer(s) 104 for a limited time or for a limited number of contacts. Thus, in some embodiments, the service provider computer(s) 104 may store a set of restrictions by which the communication(s) between the third party and the user 107 may be managed. These restrictions may be identified by the user (e.g., selected as part of user interface 114) and/or the restrictions may be determined based at least in part on an agreement between the service provider and the third-party. In some embodiments, the service provider may monetize the ability for the third-party to contact the user (and/or a number of users) by charging the third-party a fee per contact, for a predefined number of contacts, for one or more contacts allowed over a period of time, and the like. If the third party's contact request would violate the restrictions for contacting the user, then the third party's contact request may be refused. As a non-limiting example, the service provider computer(s) 104 may store restrictions indicating that the third party may only contact the user 107 a particular number of times (e.g., one time, five times, etc.). When the communications channel is established at 132, the service provider computer(s) 104 may be configured to update the restriction information (e.g., delete an association between the user 107 and the third party if only one contact was allowed and/or to otherwise indicate that the one contact has already occurred). If the third party later attempts to contact the user but the contact would violate the restrictions (e.g., the third party has already used its allowed number of contacts), the service provider computer(s) 104 may determine the contact would violate the current restrictions and the contact request may be refused. In some embodiments, the user 107 may access a user interface provided by the service provider computer(s) 104 to explicitly revoke permission for the third party to contact the user 107. A number of examples are provided in the following figures.

Figure 2:
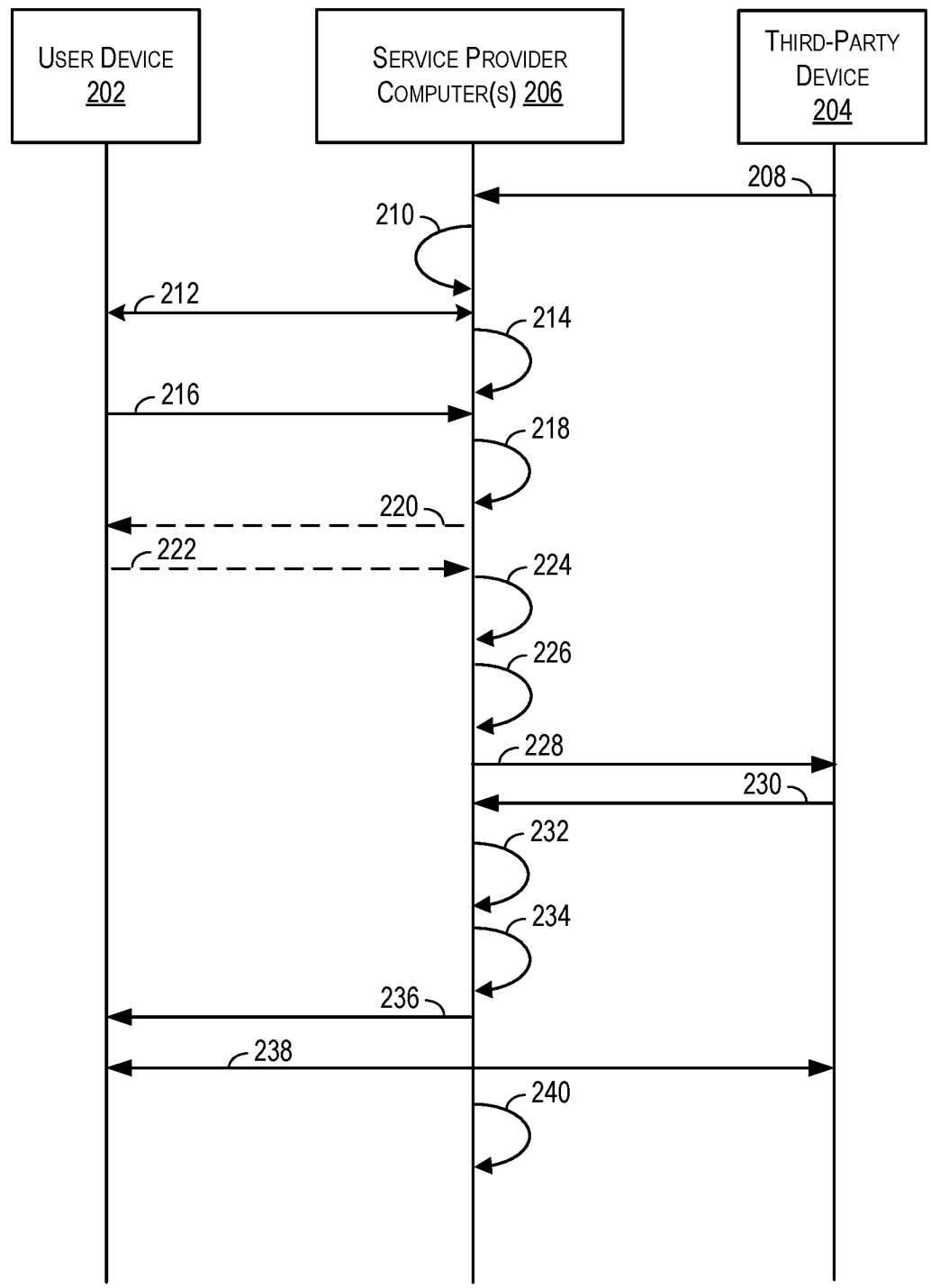
FIG. 2 illustrates a flow diagram depicting a protocol for managing communications between a user device and a third-party device, in accordance with at least one embodiment.

FIG. 2 illustrates a flow diagram depicting a protocol 200 for managing communications between a user device 202 (e.g., an example of the user device 134 of FIG. 1) and a third-party device 204 (e.g., an example of the third-party device 136 of FIG. 1), in accordance with at least one embodiment.

The protocol 200 may begin at 208, where the third-party device 204 may provide the service provider computer(s) 206 content. In some embodiments, the content may include an advertisement for good(s) and/or service(s). In some embodiments, the content may identify the third party regardless of whether the content includes an advertisement.

At 210, the service provider computer(s) 206 may provide the content received at 208 via a webpage accessible to the user device 202. In some embodiments, providing the content may include selecting the content from a set of content provided by one or more content providers including the third party. By way of example, if the content includes an advertisement, the advertisement may be selected according to any suitable technique for selecting advertisements for ad impressions. In some embodiments, a separate system different from the service provider computer(s) 206 may be responsible for receiving and serving content. The content may be associated with a set of restrictions based at least in part on a previous agreement between the service provider and the third party. By way of example, the content provided by the third-party may be associated with a set of restrictions that allows the third-party to contact a user a particular number of times and/or for a particular period of time after the user has selected the content. The service provider may enable contact(s) according to this agreement and, in some embodiments, in exchange for a fee paid by the third party (and/or the user).

At 212, the user device 202 may be utilized to execute a registration process with the service provider computer(s) 206 where a user's contact information is obtained. In some embodiments, this registration process may be performed utilizing any suitable user interface provided by the service provider computer(s) 206 and/or any suitable application programming interface provided by the service provider computer(s) 206. As used herein, contact information may include the user's name (e.g., any suitable portion of the user's name such as first, middle, and/or last), one or more physical addresses (e.g., work, home, etc.), one or more phone numbers (e.g., home, work, cell, etc.), one or more email addresses, or any suitable information with which the user may be contacted.

At 214, the service provider computer(s) 206 may be configured to store (e.g., locally, or at a remote storage location accessible to the service provider computer(s) 206) the user's contact information. By way of example, the service provider computer(s) 206 may store the user's contact information in a user profile or any suitable container (e.g., record, object, list, mapping, etc.) stored in memory. It should be appreciated that the operations at 208-214 may be performed in any suitable order.

At 216, the user device 202 may be used by a user to select the content, or otherwise indicate that they wish for the third party to contact them. In some embodiments, selection may include clicking and/or touching on the content provided at 210. Upon selecting the content, data may be received by the service provider computer(s) 206 indicating the user wishes for the third party to contact them. This data may be referred to as a "initial contact request."

At 218, the service provider computer(s) 206 may obtain contact information corresponding to the user. In some embodiments, the service provider computer(s) 206 may obtain the user's contact information from a user profile (e.g., the user profile used to store the contact information at 214). In some embodiments, the operations at 218 may include requesting contact information from the user (e.g., by providing a user interface with which the user may enter the contact information). Thus, in some embodiments, a previous record of user contact information (e.g., the contact information stored at 214) need not exist.

In some embodiments, if the service provider computer(s) 206 has obtained the user's contact information, the contact information may be provided at a user interface presented at the user device 202 at 220. In some cases, the user may be afforded the ability to modify the contact information presented at the user device 202.

In some embodiments, the user may be required to confirm, via the user interface, their request to be contacted by the third party utilizing the contact information specified. At 222, an indication of the confirmation and the contact information (as potentially modified by the user via the user interface) may be transmitted to the service provider computer(s) 206.

At 224, may store data related to the initial contact request in a record. The particular data stored may include some of the data discussed in connection with FIG. 3.

FIG. 3 illustrates two tables (e.g., table 302 and table 304) depicting two example mappings that may be utilized to maintain data for managing communications between a user device (e.g., the user device 202 of FIG. 2) and a third-party device (e.g., the third-party device 204 of FIG. 2), in accordance with at least one embodiment.

Table 302, as depicted, may include a third-party identifier (ID), a user ID, a content ID, user contact information, encrypted data (e.g., a portion of the user contact information as encrypted), a set of one or more restrictions, an access code, or any suitable combination thereof. The third-party identifier may be a name, alphanumeric value, or any suitable identifier that uniquely identifies a third party (e.g., a content provider of the content 110 of FIG. 1). The user identifier may be a name, alphanumeric value, address, username, or any suitable identifier that uniquely identifies a user (e.g., the user 107 of FIG. 1). The content ID may be an alphanumeric value that uniquely identifies an instance of content. User contact information may be any suitable combination of contact information such as name, one or more addresses, one or more phone numbers, one or more email addresses, or the like. In some embodiments, the user contact information may correspond to particular information that has been selected by the user corresponding to the user ID to utilize for contact by the third-party corresponding to the third-party ID. In some embodiments, the user may select different contact depending on the content selected. By way of example, the user may identify that a set of contact information (e.g., name and mobile phone number) may be utilized for contact by Acme when the contact is regarding particular content corresponding to content ID A10 (e.g., an advertisement for leasing an automobile) and a different set of contact information (e.g., name and home phone number) when the contact by Acme is regarding content corresponding to content ID A521 (e.g., an offer for a free service check).

In some embodiments, the table 302 may include encrypted data. By way of example, encrypted data may include a portion of the user contact information as encrypted (e.g., by the service provider computer(s) 206 of FIG. 2. As a non-limiting example, in response to user 1 selecting content corresponding to content ID A10 associated with the third-party ID "Acme," user 1's mobile phone number may be encrypted and stored as the encrypted data "LAJ3J10N." In some embodiments, the encrypted data may be generated utilizing any suitable method such as executing an encryption algorithm. In some embodiments, the encrypted data may be generated using any suitable hashing algorithm or another suitable method that generates a value different from the input (e.g., a portion of the user's contact information). The encrypted data may be stored as shown in table 302.

In some embodiments, the table 302 may include a set of restrictions for each record (e.g., each row corresponding to a particular instance of content). A set of restrictions may indicate one or more rules that limit third party contacts of a given user corresponding to the user ID. By way of example, a set of restrictions may include one or more restrictions to the number of times a third party may contact the user. As another example, a set of restrictions may include a time period during which contact is allowed (e.g., 5 days from when the user indicated content by the third party was requested, 30 days, from when the user indicated content by the third party was requested, etc.). In some embodiments, the set of restrictions may include restrictions for both the number of contacts and the time period during which contact is allowed. For example, the third party may be restricted from contacting the user more than twice and only during the week after the user indicated content by the third party was requested. As yet another example, the user may specify particular days and/or times during which the third party may contact the user. If contact is attempted outside these days/times, the contact may be refused. In some embodiments, one or more counter(s) may be maintained perhaps corresponding to each separate contact information for the user and restrictions may be enforced with these counters. For example, the third party may be restricted from contacting the user more than two times via the user's home phone and no more than three times via the user's email address. Any suitable combination of the various restrictions listed above may be utilized. In some embodiments, the service provider computer(s) 206 of FIGS. 2 and/or 104 of FIG. 1 may be configured to enforce the set of restrictions provided in the table 302. The set of restrictions may be identified based at least in part on 1) user input defining the set of restrictions, 2) an agreement between the service provider and the third party corresponding to the third-party ID, 3) a default set of restrictions, 4) a set of restrictions set by the service provider, or any suitable combination of the above.

In some embodiments, the table 302 may include one or more access code. An access code can be any suitable alphanumeric value that uniquely identifies the record (e.g., corresponding to a single row in the table 302). An access code can be generated for each form of contact information in a record (e.g., an access code for an email, an access code for a phone number, etc.) of a single access code can be generated and correspond to a single record, regardless of how many instances of various contact information are utilized. In some embodiments, an access code can be generated based at least in part on any suitable portion of a given record. As a non-limiting example, an access code may be generated based at least in part on the user's phone number and/or name. For example, the user's phone number may be encrypted to generate the access code. In some embodiments, the access code may be the result of a hashing algorithm that takes as input one or more of the instances of data (e.g., third-party ID, user ID, content ID, any suitable combination of instances of user contact information, restrictions, etc.) of a given record. As yet another example, an access code may include particular contact information for the service provider (e.g., a particular phone number and/or email address) and/or a unique identifier for the record. Thus, one example access code could be 206-123-4567-8576 (e.g., indicating a phone number 206-123-4567 and identifier 8576 that may be required to be entered upon contacting the phone number 206-123-4567). The access code may be utilized to look up and retrieve the data of the record from the table 302. In some embodiments, any suitable data storage container (e.g., an object, a list, a map, etc.) may be utilized to store the data depicted in table 302. In some embodiments, the access code and the encrypted data may be the same data and, thus, only stored once in the table 302.

Any suitable combination of the fields corresponding to any suitable number of the columns of table 302 may be utilized to identify that a contact request received from a third party corresponds to particular content, a particular user, a particular row of the table 302, and the like.

Table 304 may be similarly utilized by the service provider to maintain a record of data to be utilized for contacting a user at the request of a third party, to store restrictions to be enforced for such contact, and to store one or more access code(s) corresponding to the contact and with which the requesting entity (e.g., the third party) may be verified.

Returning to FIG. 2, at 224, data corresponding to the initial contact request (e.g., a third-party ID, a user ID, a content ID, and the contact information, or any suitable combination thereof) may be stored (e.g., as depicted in either of the tables of FIG. 3).

At 226, the service provider computer(s) 206 may generate data corresponding to the initial contact request. By way of example, the service provider computer(s) 206 may be configured to generate one or more access codes for the initial contact request (e.g., multiple access codes each corresponding to a particular instance of contact information (e.g., a particular phone number), an access code corresponding to a single record (e.g., any single row of the tables of FIG. 3), an alphanumeric value that uniquely corresponds to a record corresponding to the initial contact request, or the like. The access code(s) may be generated in any suitable manner such as the techniques discussed above in connection with FIG. 3. As another example, the service provider computer(s) 206 may generate the data using an encryption algorithm and/or a hashing algorithm and/or any suitable algorithm that may be utilized to obfuscate a portion of the user's contact information. By way of example, one portion of the user's contact information (e.g., the user's name) may be provided in the data in the clear while another portion of the user's contact information (e.g., the user's phone number, the user's email, a combination of the two, etc.) may be encrypted and sent in the data transmitted to the third party. In some embodiments, multiple instances of encrypted data may be generated from the user's contact information and provided to the third party. For example, the user's phone number may be encrypted and, separately, the user's email address may be encrypted. In some embodiments, the encrypted data provided to the third party may be utilized in lieu of generating and providing an access code, while in other embodiments, both encrypted data and one or more access codes may be utilized for lookup and/or verification.

At 228, the service provider computer(s) 206 may transmit data (e.g., or any suitable data from a corresponding row of tables 302 or 304 such as content ID, user ID, access code, one or more instances of encrypted data, one or more access codes, etc.) to the third-party device 204.

At 230, the third-party device 204 (or any suitable device operated by or on behalf of the third party) may transmit a contact request. In some embodiments, the contact request may include the data received at 230. If multiple access codes and/or one or more instances of encrypted data were provided at 228 (e.g., one for each form of contact such as a phone number, an email address, etc.), one or more of these access codes and/or one or more instances of encrypted data may be included in the contact request. In some embodiments, providing more than one access code and/or instance of encrypted data may be considered an indication that the third party desires contact to be attempted utilizing multiple instances of contact information. By way of example, an access code and/or encrypted data corresponding to a business phone and an access code and/or encrypted data corresponding to a cell phone may be provided in the contact request indicating that the third party wishes to contact to be attempted using the business phone number as well as the cell phone of the user. In some embodiments, an order of the access codes and/or instances of encrypted data may indicate an order by which the requested contact is to be attempted by the service provider computer(s) 206.

At 232, the service provider computer(s) 206 may verify the identity of the contact requestor by first retrieving the record corresponding to the data provided in the contact request (e.g., one or more access code(s), one or more instances of encrypted data, the content ID, the third-party ID, the user ID, etc.). The service provider computer(s) 206 may retrieve the user's contact information corresponding to the received data. If encrypted data is used, the service provider computer(s) 206 may decrypt the data first before record retrieval is attempted. In some embodiments, if the record cannot be found and/or data received in the contact request (e.g., a decrypted email address and/or a decrypted phone number, the third-party ID, the content ID, the user ID, the one or etc.) corresponding to and/or provided in the contact request does not match the third-party ID maintained in the record, the contact request may be refused. If the contact request is refused, the service provider computer(s) 206 may be configured to send an indication of this refusal (not depicted) to the contact requestor (e.g., the third-party device 204). In some embodiments, if particular contact information was provided for the service provider (e.g., indicating a particular phone number for the service provider is to be utilized to submit the contact request and/or the access code(s)) the service provider computer(s) 206 may verify that the proper contact information for the service provider was utilized based at least in part on the access code(s) provided. By way of example, the service provider computer(s) may specify a particular phone number of the service provider that is to be utilized to submit a contact request from a third-party requesting contact with a particular user. When the number is utilized and a call received via that number, the service provider computer(s) 206 may cause the caller and/or calling device (e.g., third-party device 204) to submit one or more access codes corresponding to the request. If the access codes provided are not associated with the particular telephone number being utilized by the calling device (e.g., as ascertained from the record storing those associations), the contact request may be refused. Otherwise, the protocol 200 may proceed to 234.

At 234, the service provider computer(s) 206 may enforce any suitable restriction of the set of restrictions corresponding to the record retrieved at 232. By way of example, if the record indicates a number of contacts to be allowed for the received data (e.g., corresponding to one or more instances of contact information such as name and/or home phone) the service provider computer(s) 206 may execute a check to ensure that establishing the contact requested would not violate such a restriction. By way of example, one or more counter(s) may be maintained, each corresponding to particular contact information of the user. If the counter indicates the third party is to be allowed at least one more contact via the provided access code(s) then the service provider computer(s) 206 may be configured to proceed to 236. If the counter indicates the third-party is not allowed any more contacts via the provided access codes, then the contact request may be refused and the third party notified (e.g., via the third-party device 204). In some embodiments, if the contact would not be allowed based on the set of restrictions, the service provider computer(s) 206 may be configured to transmit data to the third-party device 204 indicating the contact is not allowed. In other embodiments, the service provider computer(s) 206 may transmit data to the third-party device 204 enabling the set of restrictions to be modified. By way of example, the service provider computer(s) 206 may transmit data indicating that the set of restrictions may be modified (e.g., to increase or otherwise modify a number of allowed contacts, to increase or otherwise modify a period of time during which contacts will be allowed, etc.). In some embodiments, modifying the set of restrictions by the third party may be allowed in exchange for a fee paid by the third party.

In some embodiments, the set of restrictions corresponding to the one or more contact request provided at 230 may indicate a time period (e.g., 24 hours, 5 days, 30 days, etc.) from when the user first provided the initial contact request at 216 and/or a time stamp corresponding to the day/time at which the initial contact request was provided at 216. The particular time period may be predefined (e.g., by default) and/or the particular time period may be user-specified (e.g., as specified by the user via the data received at 222) and/or the particular time period may be based on an agreement between the service provider and the third party (e.g., in exchange for a fee and/or a subscription, etc.) or between the service provider and the user (e.g., in exchange for a fee and/or a subscription, etc.). The service provider computer(s) 206 may be configured to ensure that the time period from the day/time at which the initial contact request was received at 216 has not expired. If it has, the contact request received at 230 may be refused and the third party may be notified (e.g., via the third-party device 204) and/or the service provider computer(s) 206 may transmit data to the third-party device 204 enabling the set of restrictions to be modified as described above in connection with 234. If expiration has not yet occurred, or if the set of restrictions are modified to allow the contact, the service provider computer(s) 206 may proceed to 236.

As yet another example, the set of restrictions corresponding to the contact request provided at 230 may indicate day(s) and/or time(s) at which contact is to be allowed (e.g., between the hours of 5 PM and 7 PM). These types of restrictions may be user defined and/or may be based at least in part on an agreement between any suitable combination of the service provider, the third party, and/or the user. If the service provider computer(s) 206 determine that the current day/time is outside of those specified, the contact request may be refused and the third party may be notified (e.g., via the third-party device 204) and/or the service provider computer(s) 206 may transmit data to the third-party device 204 enabling the set of restrictions to be modified as described above. Alternatively, contact may be delayed until such a next available day and/or time that falls within the days/times specified as allowable for contact. If the current day/time falls within the specified days/times, the service provider computer(s) 206 may proceed to 236.

At 236, the service provider computer(s) 206 may attempt to contact the user utilizing the contact information retrieved at 232 and corresponding to the contact request. By way of example, the service provider computer(s) 206 may forward a call initiated by the third-party device 204 to the user device 202.

As another example, the service provider computer(s) 206 may initiate a separate call to the user device 202. In some embodiments, the service provider computer(s) 206, once communicatively connected with the user device 202, may request the user confirm that he allows the contact. If confirmation is required and is not given, the service provider computer(s) 206 may inform the third-party device 204 and contact attempts may cease. If confirmation is received (or confirmation is not required), then the service provider computer(s) 206 may merge the two calls such that the user device 202 and the third-party device 204 are communicatively connected. In some embodiments, the service provider computer(s) 206 may drop from the call or may maintain the call until either the user device 202 or the third-party device 204 drop from the call.

As yet another example, the service provider computer(s) 206 may forward an email initiated from the third-party device 204 to the user device 202. In some embodiments, the service provider computer(s) 206 may indicate the email is from the service provider. The email may or may not have data indicating that the contact is occurring due to the user's initial contact request and in accordance with various (default and/or user-specified) restrictions. In some embodiments, the service provider computer(s) 206 may set the from address of the email to be the email address of the email received at 230 (e.g., the email address of the third-party). If the third-party's address is provided in the from field, the service provider computer(s) 206 may otherwise indicate in the subject line and/or the body of the email that replying to the email will cause the third party to be in possession of the user's contact information.

In some embodiments, the communications channel may be considered established at 238 in response to the data provided at 236. In some embodiments, the user device 202 and the third-party device 204 may exchange data between each other or the data may be exchanged between the two via the service provider computer(s) 206. For example, the user may respond to the email sent at 236 which may be received by service provider computer(s) 206. The email may include the access code provided at 230 which may be utilized, once again, to retrieve the corresponding record to obtain the email address of the third party which was utilized for the contact request at 230. The email may then be forwarded to the email address of the third party and accessed via the third-party device. Thus, in some embodiments, the user and the third party may communicate with one another via the service provider computer(s) 206 even though the third party is never in possession of the user's contact information.

At 240, or at any suitable time, the service provider computer(s) 206 may be configured to update any suitable number of counters to indicate the contact established at 238 has occurred. In some embodiments, if the third party is not allowed any more contact, the service provider computer(s) 206 may delete the record generated in response to receiving the initial contact request. This may cause subsequent contact requests from the third party for the user to be refused. In some embodiments, if the update indicates that the third party would not be allowed any subsequent contacts with the user, the service provider computer(s) 206 may transmit data to the third-party device 204 enabling the set of restrictions to be modified as described above (e.g., allowing the number of contacts to be increased in exchange for a fee).

Figure 4:
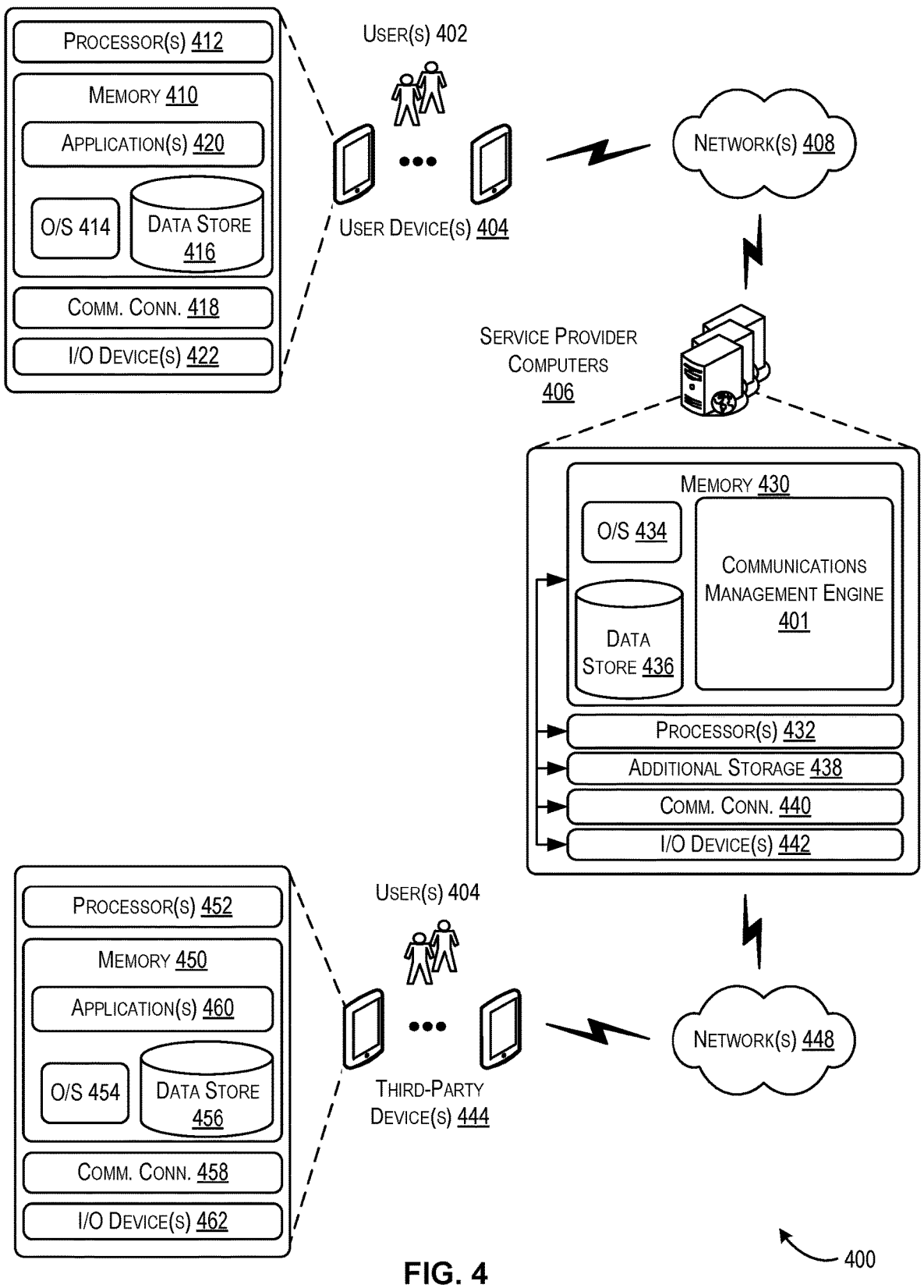
FIG. 4 illustrates example components of a communication system, in accordance with at least one embodiment.

FIG. 4 illustrates components of a communications system 400 according to a particular embodiment. In communications system 400, one or more user(s) 402 may each utilize a user device (e.g., a user device of the user device(s) 404) to view information via web pages provided by a service provider (e.g., an electronic marketplace provided by the service provider computer(s) 406 or by other computers associated with a service provider of the electronic marketplace), to provide contact information, and/or to provide input indicating they wish to be contacted by a particular third-party about particular content (e.g., a particular advertisement). The user device(s) 404 may each be an example of the user device 134 of FIG. 1, the user device 202 of FIG. 2, etc. A user of each user device may access any suitable input/output devices (e.g., I/O device(s) 422) such as a keyboard, a microphone, a camera, and the like, to provide input (e.g., via an application(s) 420 running on the user device(s) 404) to service provider computer(s) 406 via one or more network(s) (e.g., network(s) 408). In some aspects, the application(s) 420 (e.g., a web browser application) operating on the user device(s) 404, respectively, may be hosted, managed, and/or provided by a computing service or service provider, such as by utilizing one or more service provider computer(s) 406.

In some examples, the network(s) 408 may include any one or a combination of many different types of networks, such as cable networks, the Internet, wireless networks, cellular networks, and other private and/or public networks. It should be appreciated that the described techniques may apply in other client/server arrangements, as well as in non-client/server arrangements (e.g., locally stored applications, etc.). In some embodiments, the functionality of the communications management engine 401 may be provided as a software service with which input from one device (e.g., a third-party device of the third-party device(s) 444) (e.g., received via network(s) 448) may be forwarded and/or provided (e.g., via the network(s) 408) to a second device (e.g., a user device of the user device(s) 404) via the communications management engine 401. In some embodiments, the network(s) 448 may also include any one or a combination of many different types of networks, such as cable networks, the Internet, wireless networks, cellular networks, and other private and/or public networks.

The service provider computer(s) 406, perhaps arranged in a cluster of servers or as a server farm, may host the application(s) 420 operating on the user device(s) 404 and/or cloud-based software services. Other server architectures may also be used to host the application(s) 420 and/or cloud-based software services. The application(s) 420 operating on the user device(s) 404 may be capable of handling requests from the user(s) 402 and serving, in response, various user interfaces and/or output that can be presented at the user device(s) 404 (e.g., via a display and/or speaker). The application(s) 420 operating on the user device(s) 404 can present any suitable type of website that supports electronic marketplace webpages, obtaining user information and/or user input, and the like. The described techniques can similarly be implemented outside of the application(s) 420, such as with other applications running on the user device(s) 404. In some embodiments, the application(s) 420 and/or application(s) 460 may include and email application and/or a telecommunication application (e.g., a phone application) with which emails and phone calls may be supported, respectively.

The user device(s) 404 and/or the third-party device(s) 444 may each be any suitable type of computing device such as, but not limited to, a mobile phone, a smart speaker, a handheld scanner, a touch screen device, a smartphone, a personal digital assistant (PDA), a laptop computer, a desktop computer, a thin-client device, a tablet PC, an electronic book (e-book) reader, etc. In some embodiments, the third-party device(s) 444 may be any suitable number of server computers. In some examples, the user device(s) 404 and/or the third-party device(s) 444 may be in communication with the service provider computer(s) 406 via the network(s) 408 and 448, respectively, or via other network connections.

In one illustrative configuration, the user device(s) 404 and third-party device(s) 444 may include at least one memory 410 and 450 and one or more processing units (or processor(s)) 412 and processor(s) 452. The processor(s) 412 and 452 may be implemented as appropriate in hardware, computer-executable instructions, firmware, or combinations thereof. Computer-executable instruction or firmware implementations of the processor(s) 412 and 452 may include computer-executable or machine-executable instructions written in any suitable programming language to perform the various functions described.

The memories 410 and/or 450 may store program instructions that are loadable and executable on the processor(s) 412 and 450, as well as data generated during the execution of these programs. Depending on the configuration and type of user computing device, the memories 410 and/or 452 may be volatile (such as random access memory (RAM)) and/or non-volatile (such as read-only memory (ROM), flash memory, etc.). The user device(s) 404 and/or third-party device(s) 444 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memories 410 and/or 452 may include multiple different types of memory, such as static random access memory (SRAM), dynamic random access memory (DRAM), or ROM.

Turning to the contents of the memories 410 and 452 in more detail, the memories 410 and/or 452 may include an operating systems 414 and 454, respectively, one or more data stores 416 and 456, respectively, and one or more application programs, modules, or services for implementing the features of the communications management engine 401 disclosed herein, provided via the application(s) 420 and/or 460. The application(s) 420 and/or 460 may be configured to receive, store, and/or display a network page or other interface for interacting with the service provider computer(s) 406 and/or for sending/receiving email messages and/or sending/receiving telephone calls. In some embodiments, the application(s) 420 and/or 460 may be configured to present user options and/or receive user input. In some embodiments, the memories 410 and 452 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In still further embodiments, the memory 410 and/or the memory 430 may be configured to store user contact information for one or more users.

The user device(s) 404 and third-party device(s) 444 may also contain communications connection(s) 418 and 458 that allow the user device(s) 404 and third-party device(s) 444 to communicate with a stored database, another computing device or server (e.g., the service provider computer(s) 406), user terminals and/or other devices on the network(s) 408 or network(s) 448, respectively. In some embodiments, network(s) 408 and network(s) 448 are the same one or more networks. The user device(s) 404 and third-party device(s) 444 may also include I/O device(s) 422 and 462, such as a camera, a keyboard, a mouse, a pen, a microphone, a touch input device, a display, speakers, and the like.

In some aspects, the service provider computer(s) 406 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 406 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 406 may be in communication with the user device(s) 404 and/or third-party device(s) 444 and/or other service providers via the network(s) 408 and/or network(s) 448 or via other network connections. The service provider computer(s) 406 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 406 may include at least one memory 430 and one or more processing units (or processor(s)) 432. The processor(s) 432 may be implemented as appropriate in hardware, computer-executable instructions, firmware, or combinations thereof. Computer-executable instruction or firmware implementations of the processor(s) 432 may include computer-executable or machine-executable instructions written in any suitable programming language to perform the various functions described.

The memory 430 may store program instructions that are loadable and executable on the processor(s) 432, as well as data generated during the execution of these programs. Depending on the configuration and type of service provider computer(s) 406, the memory 430 may be volatile (such as RAM) and/or non-volatile (such as ROM, flash memory, etc.). The service provider computer(s) 406 or servers may also include additional storage 438, which may include removable storage and/or non-removable storage. The additional storage 438 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 430 may include multiple different types of memory, such as SRAM, DRAM, or ROM.

The memory 430, the additional storage 438, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 430 and the additional storage 438 are all examples of computer storage media. Additional types of computer storage media that may be present in the service provider computer(s) 406 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 406. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 406 may also contain communications connection(s) 440 that allow the service provider computer(s) 406 to communicate with a stored database, another computing device or server, user terminals and/or other devices on the network(s) 408 and/or network(s) 448. The service provider computer(s) 406 may also include I/O device(s) 442, such as a keyboard, a mouse, a pen, a voice input device, a touch input device, a display, speakers, a printer, etc.

Turning to the contents of the memory 430 in more detail, the memory 430 may include an operating system 434, one or more data stores 436, and/or one or more application programs, modules, or services for implementing the features disclosed herein. The memory 430 may store instructions for a communications management engine 401.

Figure 5:
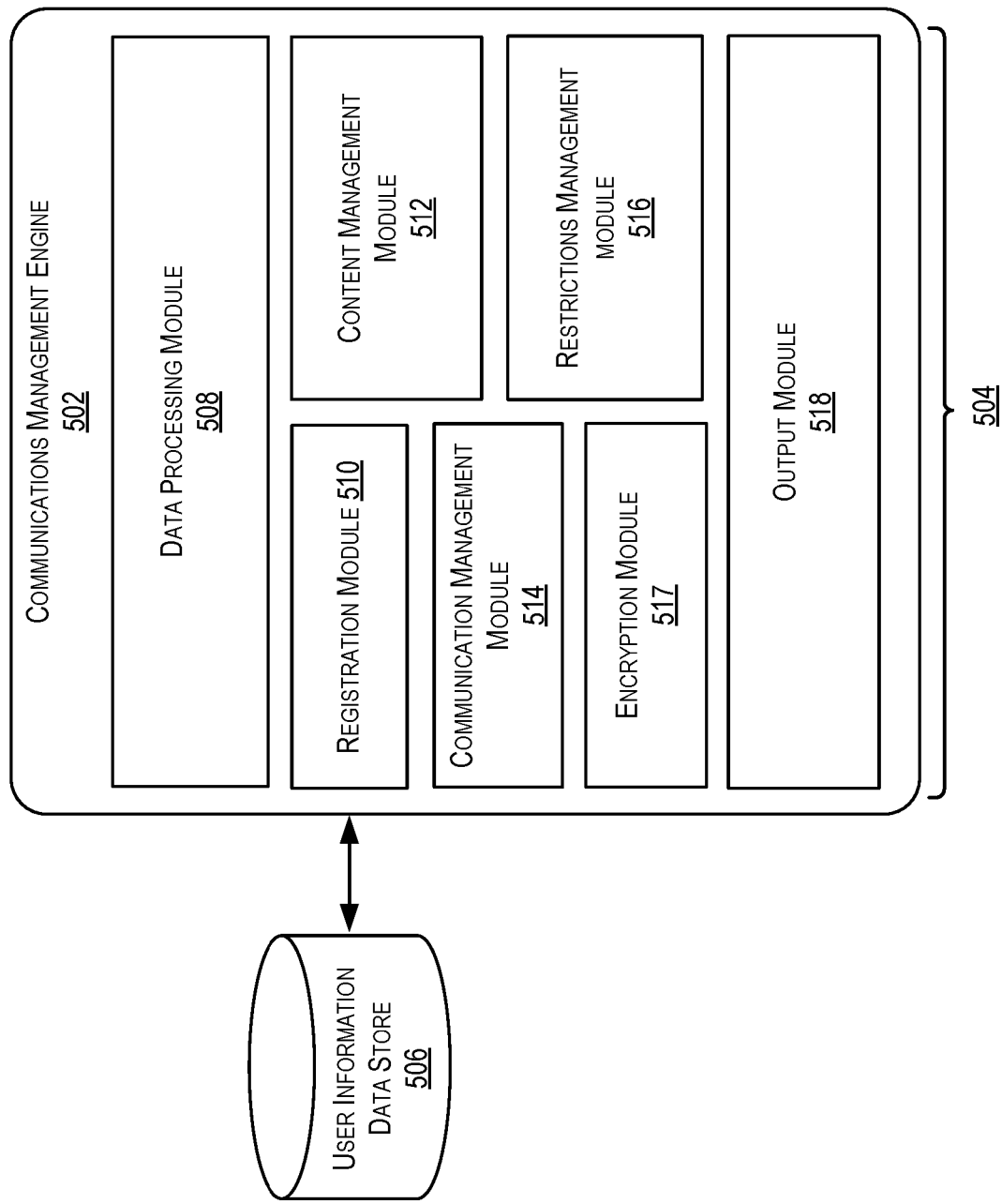
FIG. 5 is a schematic diagram of an example computer architecture for the communications management engine, including a plurality of modules that may perform functions in accordance with at least one embodiment.

FIG. 5 is a schematic diagram of an example computer architecture 500 for the communications management engine 502, including a plurality of modules 504 that may perform functions in accordance with at least one embodiment. The modules 504 may be software modules, hardware modules, or a combination thereof. If the modules 504 are software modules, the modules 504 can be embodied on a computer readable medium and processed by a processor in any of the computer systems described herein. It should be noted that any module or data store described herein, may be, in some embodiments, be a service responsible for managing data of the type required to make corresponding calculations. The modules 504, or some portion of the modules 504, may be operate at the service provider computer(s) 406 of FIG. 4, or the modules may operate as separate modules or services external to the service provider computer(s) 406 (e.g., as part of the applications 420 and/or 460 of FIG. 4 operating on the user device(s) 404 and/or the third-party device(s) of FIG. 4, respectively).

In the embodiment shown in the FIG. 5, a data store (e.g., user information data store 506) is shown, although data can be maintained, derived, or otherwise accessed from various data stores, either remote or local to the communications management engine 502, to achieve the functions described herein. In at least one embodiment, the data store described herein may be physically located on the user device(s) 404 or alternatively, the data store may be local and/or otherwise accessible to the service provider computer(s) 406. The communications management engine 502, as shown in FIG. 5, includes various modules such as a data processing module 508, a registration module 510, a content management module 512, a communication management module 514, a restrictions management module 516, and an output module 518. Some functions of the modules 504 are described below. However, for the benefit of the reader, a brief, non-limiting description of each of the modules is provided in the following paragraphs.

In at least one embodiment, the communications management engine 502 includes the data processing module 508. Generally, the data processing module 508 may be utilized to receive any suitable information with respect to any example provided herein. The data processing module 508 may include any suitable number of application programming interfaces with which the functionality of the communications management engine 502 may be invoked. By way of example, the data processing module 508 may receive (e.g., via an API) any suitable data from any suitable source. Additionally, the data processing module 508 may be configured to invoke the functionality provided by any suitable combination of the remaining modules of the modules 504. By way of example, the data processing module 508 may be configured to receive any suitable data provided by the user device 202 and/or the third-party device 204 of FIG. 2. Any suitable portion of the data provided may be provided by the data processing module 508 to any other module of the modules 504.

In at least one embodiment, the communications management engine 502 includes the registration module 510. The registration module 510 may be configured to perform any suitable operations corresponding to performing a registration process between the service provider computer(s) 406 of FIG. 4 and the user device(s) 404 of FIG. 4. In some embodiments, these operations may correspond to the operations discussed above in connection with 212 and 214 of FIG. 2. In some embodiments, the registration module 510 may receive user contact information (e.g., name(s), address/addresses, phone number(s), email address/addresses, days/times at which contact is to be allowed and/or attempted, etc.). The registration module 510 may be configured to store this data in the user information data store 506. In some embodiments, the registration module 510 may be configured to generate and/or modify a record (e.g., a row of table 302 or table 304 of FIG. 3) to store such data. In some embodiments, the registration module 510 may be part of an electronic marketplace. In some embodiments, the operations of the registration module 510 may be provided by a separate module different from the communications management engine 502 and stored in the user information data store 506 which can be accessed by the communications management engine 502.

In at least one embodiment, the communications management engine 502 includes the content management module 512. The content management module 512 may perform any suitable operations related to obtaining content from third party providers and presenting such content to user devices (e.g., via an electronic marketplace). The content management module 512 may perform any suitable operations corresponding to 208 and 210 of FIG. 2. In some embodiments, the functionality of the content management module 512 may be performed by a separate module different from the communications management engine 502.

In at least one embodiment, the communications management engine 502 includes the communication management module 514. The communications management module 514 may be configured to perform any suitable operations corresponding to receiving user input (e.g., indicating a contact request by the user), generating and/or updating a record (e.g., a record of table 302 or table 304) with any suitable data (e.g., any of the data of tables 302 or 304), establishing a communications channel, attempting contact, restricting contact, verifying an identity of a contact requestor, or the like. By way of example, the communications management module 514 may perform the operations discussed above in connection with the service provider computer(s) 206 from 216-232 and 236-240 of FIG. 2.

In at least one embodiment, the communications management engine 502 includes the restrictions management module 516. The restrictions management module 516 may be configured to perform any suitable operations corresponding to enforcing contact restrictions. By way of example, the restrictions management module 516 may perform the operations discussed above in connection with 234 and 240 of FIG. 2. In some embodiments, restrictions management module 516 may cause output module 518 to transmit and/or data processing module 508 to receive any suitable data to/from a third-party device to allow a set of restrictions to be modified as described in connection with FIG. 2 (e.g., setting/modifying a number of allowed contacts and/or period of time for allowed contact, potentially in exchange for a fee). In some embodiments, the restrictions management module 516 may be configured to provide any suitable interfaces and/transmit any suitable data to enable a third party to pay a fee corresponding to a modification of a set of restrictions.

In at least one embodiment, the communications management engine 502 includes encryption module 517. Encryption module 517 may be configured to generate any suitable number of instances of encrypted or otherwise obfuscated data. By way of example, the encryption module 517 may utilize any suitable encryption and/or hashing algorithm with a portion (e.g., some or all) of the user's contact information to generate encrypted and/or obfuscated data (e.g., the data 130 of FIG. 1, a portion of the data provided at 228 of FIG. 2, etc.). This data may be derived from some portion of the user's contact information but is not the same as the user's contact information. As a non-limiting example, the encryption module 517 may calculate (e.g., encrypt or otherwise obfuscate) a value corresponding to a user's phone number by providing the phone number as input to an encryption and/or hashing algorithm. The value obtained as output of the calculation (e.g., the encrypted data and/or the access code of table 302 of FIG. 3) may be stored by the encryption module 517 in a record (e.g., the corresponding record of table 302) for subsequent usage. In some embodiments, upon receiving a contact request from a third party, some portion of the contact request may be processed by the encryption module 517 to calculate a resultant value (e.g., by decrypting the received value, by using another hashing algorithm, etc.). The resultant value may be provided to the communication management module 514 to enable the communications management module 514 to verify that the resultant value matches some portion of data stored in a record associated with the contact request. For example, if the data received from a third party in a contact request corresponds to an encrypted version of the user's phone number, the received value may be decrypted and the resultant value may be compared to the user's phone number as maintained in the record. If a match is determined, the contact request and/or the third party may be considered verified and the process may continue to enforce the corresponding set of restrictions and/or to establish and/or refuse the contact request as appropriate. As another example, the encrypted version of the data (e.g., as received in the contact request) may be compared to an encrypted value stored in the record (e.g., the encrypted data corresponding to a row of table 302) and if the values match, the process may continue to enforce the corresponding set of restrictions and/or to establish and/or refuse the contact request as appropriate.

In at least one embodiment, the communications management engine 502 includes the output module 518. The output module 518 may be configured to transmit any suitable data a user device (e.g., the user device 202 of FIG. 2) and/or a third-party device (e.g., the third-party device 204 of FIG. 2). In some embodiments, the output module 518 may be configured to provide any suitable interface discussed herein and to receive any suitable data from the same.

Figure 6:
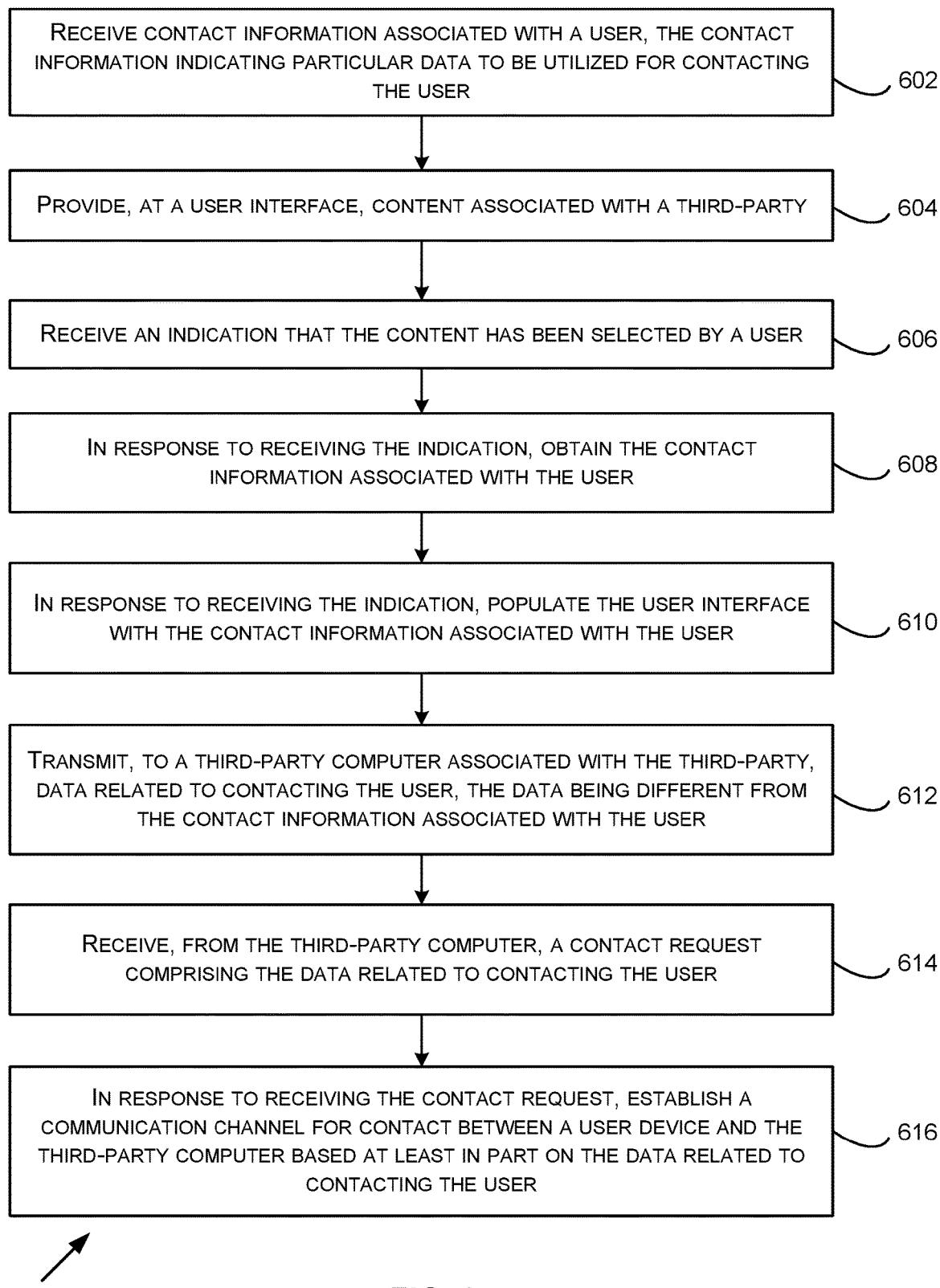
FIG. 6 includes a flowchart illustrating an example method for responding to network degradation in accordance with at least one embodiment.

FIG. 6 includes a flowchart illustrating an example method 600 for responding to network degradation in accordance with at least one embodiment. A computer-readable medium may store computer-executable instructions that, when executed by at least one processor, cause at least one computer to perform instructions comprising the operations of the method 600. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by a computing system (e.g., the communications system 400) comprising the communications management engine 502 of FIG. 5 which may operate in whole or in part on a user device (e.g., one or more of the user device(s) 404 and/or the third-party device(s) 444 of FIG. 4 and/or the service provider computer(s) 406 of FIG. 4). In some embodiments, the method 600 may be performed by the communications management engine 502.

The method 600 may begin at block 602, where contact information associated with a user may be received. In some embodiments, the contact information may indicate particular data (e.g., a user's phone number, a user's email address, etc.) to be utilized for contacting the user.

At 604, content associated with a third-party (e.g., content 110 of FIG. 1) may be provided by a service provider computer (e.g., the service provider computer(s) 104 of FIG. 1) via a user interface (e.g., the user interface 108 of FIG. 1). In some embodiments, the content may correspond to an advertisement, a survey, a brochure, or the like.

At 604, an indication that the content has been selected by a user may be received. The user may select the content using any suitable input device of the user device (e.g., the I/O device(s) 422 of FIG. 4). In some embodiments, selection of the content may indicate that the user is interested in being contacted about a subject of the content (e.g., an item featured in the content).

At 606, in response to receiving the indication, contact information associated with the user may be obtained (e.g., via the registration module 510 of FIG. 5). In some embodiments, the contact information may be obtained via a user profile associated with the user. In some embodiments, the user profile may be maintained as part of an account associated with an electronic marketplace. In some embodiments, at least a portion of the contact information may be requested from the user.

At 608, in response to receiving the indication, the user interface (e.g., the same or different user interface such as user interface 114 of FIG. 1) may be populated (e.g., by the output module 518 of FIG. 5) with the contact information associated with the user.

At 610, data related to contacting the user may be transmitted (e.g., by the communication management module 514) to a third-party computer associated with the third-party. In some embodiments, the data may be different from the contact information associated with the user. Examples of such data is discussed above in connection with 226 of FIG. 2.

At 612, a contact request may be received (e.g., via the data processing module 508 of FIG. 5) from a third-party computer. In some embodiments, the contact request may comprise the data related to contacting the user. In response to receiving the contact request, a communication channel may be established (e.g., by the communication management module 514) for contact between a user device and the third-party computer based at least in part on the data relating to contacting the user.

Figure 7:
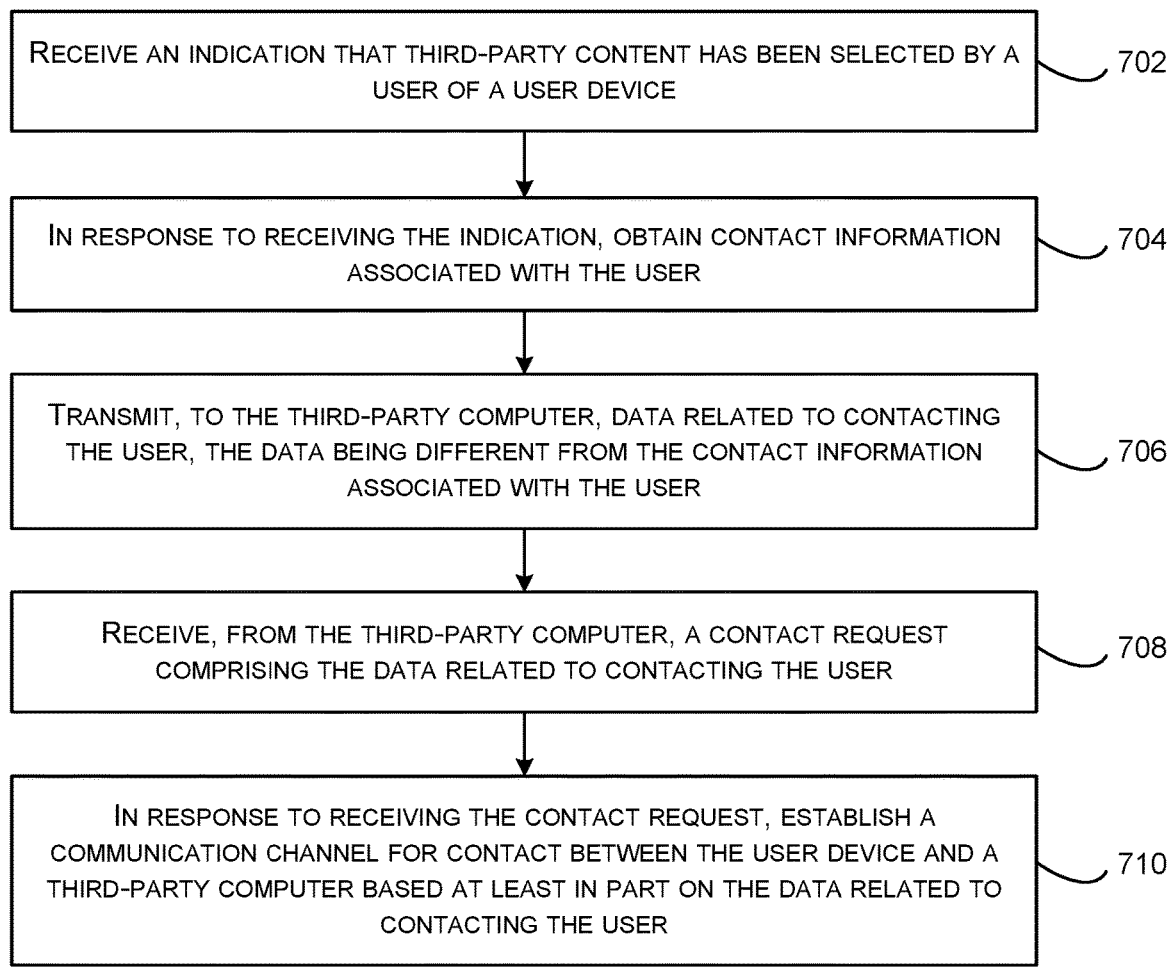
FIG. 7 includes another flowchart illustrating another example method for responding to network degradation in accordance with at least one embodiment.

FIG. 7 includes another flowchart illustrating another example method 700 for responding to network degradation in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the modules 504 of the communications management engine 502 of FIG. 5 which may operate in whole or in part on a computing device (e.g., one or more of the user device(s) 404 and/or the third-party device(s) 444 of FIG. 4 and/or the service provider computer(s) 406 of FIG. 4). As a non-limiting example, the method 700 may be performed by the computing device (e.g., the service provider computer(s) 406 of FIG. 4) having one or more processors and a memory storing executable instructions that, upon execution by the one or more processors, cause the computing device to perform at least the operations of method 700.

The method 700 may begin at block 702, where an indication that third-party content has been selected by a user of a user device (e.g., the user device 202 of FIG. 2) may be received. By way of example an indication that a user has selected content 110 of FIG. 1 may be received (e.g., by the data processing module 508 of FIG. 5).

At 704, in response to receiving the indication, contact information associated with the user may be obtained (e.g., by the registration module 510 of FIG. 5). In some embodiments, the contact information may be obtained from a user profile (e.g., a user profile retrieved from the user information data store 506 of FIG. 5).

At 706, data related to contacting the user may be transmitted (e.g., by the communication management module 514) to the third-party computer (e.g., the third-party device 204 of FIG. 2). In some embodiments, the data transmitted to the third-party computer is different from the contact information associated with the user. By way of example, contact information associated with the service provider computer and/or one or more access code(s) may be included in the data transmitted to the third-party computer.

At 708, a contact request may be received from the third-party computer. In some embodiments, the contact request may comprise the data related to contacting the user (e.g., the access code(s) transmitted at 706).

At 710, in response to receiving the contact request, a communication channel may be established (e.g., by the communications management module 514 via email or telephonically) for contact between the user device and a third-party computer based at least in part on the data related to contacting the user.

Figure 8:
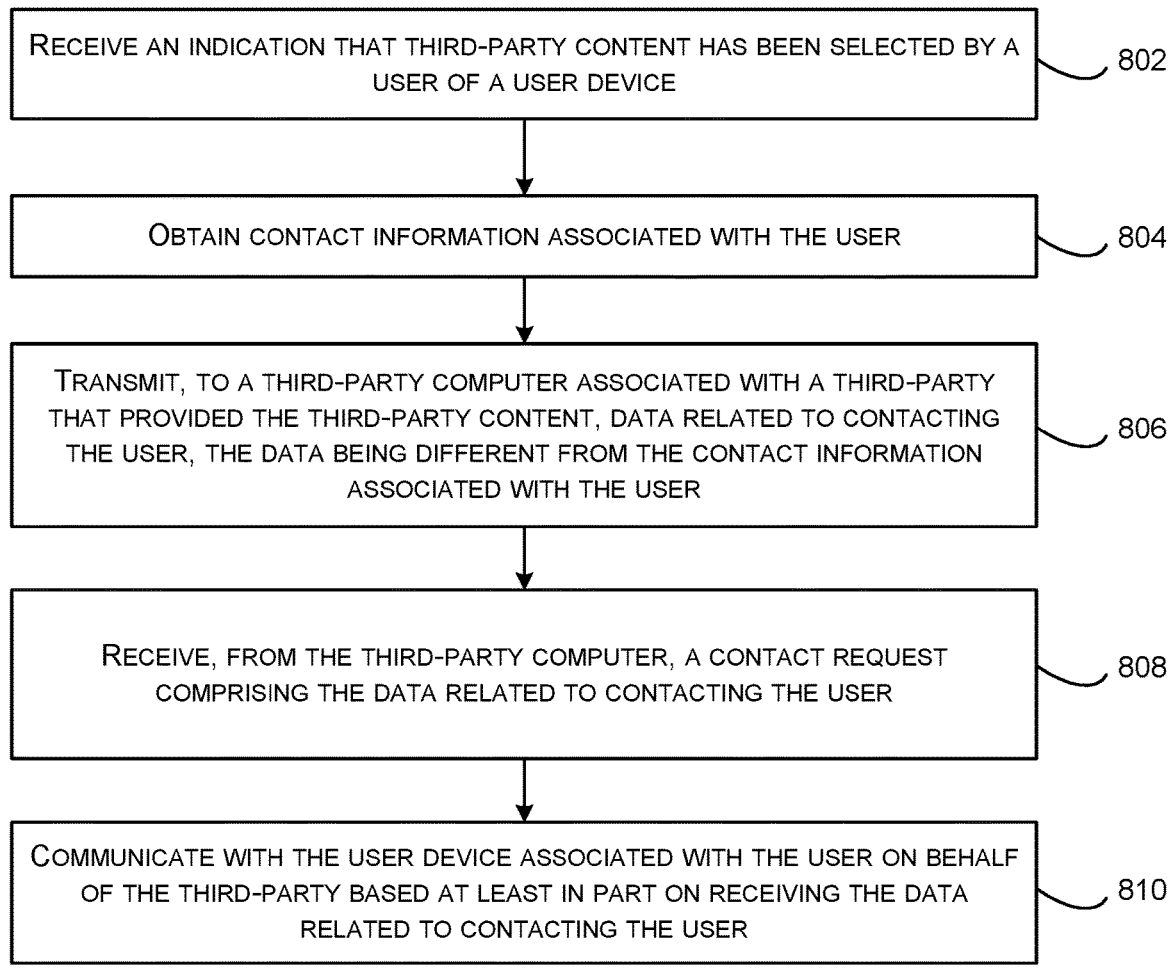
FIG. 8 includes yet another flowchart illustrating yet another example method responding to network degradation in accordance with at least one embodiment.

FIG. 8 includes yet another flowchart illustrating yet another example method 800 responding to network degradation in accordance with at least one embodiment. A computer-readable medium may store computer-executable instructions that, when executed by at least one processor, cause at least one computer to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 504 of the communications management engine 502 which may operate in whole or in part on a computing device (e.g., a user device of the user device(s) 404 and/or the third-party device(s) 444 of FIG. 4 and/or the service provider computer(s) 406 of FIG. 4).

The method 800 may begin at 802, where an indication that third-party content has been selected by a user of a user device may be received (e.g., by the data processing module 508 of FIG. 5).

At 804, contact information associated with the user may be obtained (e.g., by the registration module 510 from the user information data store 506 of FIG. 5).

At 806, data related to contacting the user may be transmitted to a third-party computer (e.g., the third-party device 204 of FIG. 2) that is associated with a third-party that provided the third-party content. In some embodiments, the data (e.g., one or more access codes) may be different from the contact information associated with the user.

At 808, a contact request may be received (e.g., by the data processing module 508) from the third-party computer (e.g., the third-party device 204 of FIG. 2). In some embodiments, the contact request may comprise the data related to contacting the user (e.g., the one or more access codes).

At 810, the communications management module 514 may communicate (e.g., via email, telephonically, etc.) with the user device associated with the user (e.g., the user device 202 of FIG. 2) on behalf of the third-party based at least in part on receiving the data related to contacting the user. In some embodiments, the communications may include sending data received from the third-party computer to the user device and/or sending data received from the user device to the third-party computer.

Figure 9:
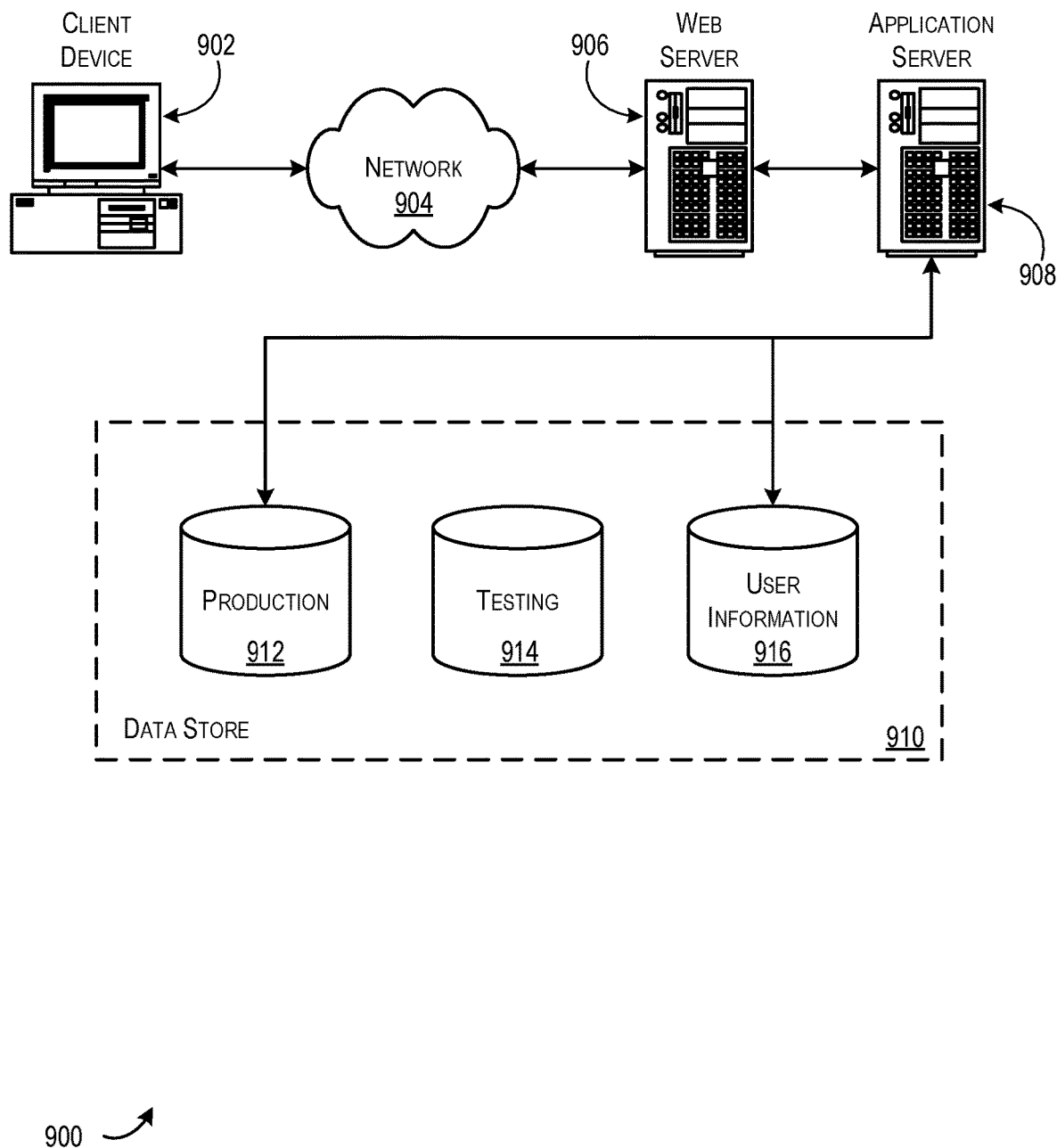
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements and figures in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a service provider computer, contact information associated with a user, the contact information indicating particular data to be utilized for contacting the user;
   maintaining a record of the contact information;
   providing, by the service provider computer to a user device, content associated with a third party;
   receiving, from the user device, an indication that the content has been selected by the user;
   in response to receiving the indication that the content has been selected, generating, by the service provider computer, an access code related to the user and the third party, the access code being generated based at least in part on at least a portion of the contact information associated with the user;
   transmitting, by the service provider computer to a third-party computer associated with the third party, the access code, the access code being different from the contact information associated with the user;
   storing the access code in the record;
   receiving, from the third-party computer, a contact request comprising the access code;
   comparing the access code that was received in the contact request to the access code that was stored in the record; and
   based at least in part on determining the access code received in the contact request matches the access code stored in the record, establishing, by the service provider computer, a communication channel between the user device and the third-party computer while maintaining confidentiality of the contact information associated with the user, the communications channel enabling bi-directional exchanges regarding the content between the user device and the third-party computer via the service provider computer, the service provider computer restricting particular exchanges via the communications channel based at least in part on a set of user-defined restrictions comprising a number of permissible contacts, a duration of permissible contact, or an allowed time-period for permissible contacts.

2. The computer-implemented method of claim 1, wherein restricting particular exchanges via the communications channel further comprises:
   maintaining a set of restrictions for contacting the user, the set of restrictions comprising a number of permissible contacts or a duration of permissible contact;
   receiving, from the third-party computer via the communications channel, a subsequent contact request associated with contacting the user; and
   refusing the subsequent contact request based at least in part on the set of restrictions for contacting the user.

3. The computer-implemented method of claim 2, further comprising maintaining a mapping between a first identifier associated with the user, a second identifier associated with the third party, the contact information associated with the user, a content identifier, and the access code transmitted to the third party.

4. The computer-implemented method of claim 3, further comprising retrieving the contact information for the user based at least in part on using the access code received in the contact request to retrieve the contact information from the mapping.

5. A service provider computer, comprising:
   one or more processors; and
   a memory storing executable instructions that, upon execution by the one or more processors, cause the service provider computer to perform operations comprising, at least:
      maintaining contact information associated with a user within a record;
      receiving, from a user device, an indication that third-party content has been selected;
      generating one or more access codes related to the user and the third party, each access code being generated based at least in part on at least a respective portion of the contact information associated with the user;
      transmitting, to a third-party computer, the one or more access codes related to contacting the user, the one or more access codes being different from the contact information associated with the user;
      storing, in the record, the one or more access codes related to contacting the user;
      receiving, from the third-party computer, a contact request comprising at least one access code of the one or more access codes related to contacting the user;
      comparing the at least one access code that was received in the contact request to the one or more access codes related to contacting the user that was stored in the record; and
      based at least in part on determining the at least one access code received in the contact request matches the one or more access codes stored in the record, establishing a communication channel for contact between the user device and the third-party computer, the communication channel enabling bi-directional exchanges between the user device and the third-party computer via the service provider computer, the service provider computer restricting particular exchanges via the communications channel based at least in part on a set of user-defined restrictions comprising a number of permissible contacts, a duration of permissible contact, or an allowed time-period for permissible contacts.

6. The service provider computer of claim 5, wherein the service provider computer performs further operations comprising encrypting at least a portion of the contact information to generate each of the one or more access codes related to contacting the user.

7. The service provider computer of claim 5, wherein the service provider computer performs further operations comprising maintaining restriction information associated with the user and the third-party content, the restriction information comprising one or more restrictions by which contact with the user is restricted.

8. The service provider computer of claim 5, wherein the service provider computer performs further operations comprising:
   maintaining a mapping between a first identifier of the user and a second identifier of a third-party provider that indicates the third-party provider has been provided permission to contact the user;
   receiving a subsequent indication that the user has revoked the provided permission; and
   deleting the mapping between the user and the third-party provider based at least in part on receiving the subsequent indication that the user has revoked the provided permission.

9. The service provider computer of claim 5, wherein establishing the communication channel for contact between the user device and the third-party computer comprises at least one of: forwarding a telephone call or merging multiple telephone calls.

10. The service provider computer of claim 5, wherein the service provider computer performs further operations comprising:
    receiving, from the user device, a subsequent communication via the communication channel; and
    providing, to the third-party computer, the subsequent communication received from the user device.

11. The service provider computer of claim 5, wherein the third-party computer is restricted from ever obtaining the contact information of the user.

12. A computer-readable storage medium having stored thereon computer-executable instructions that, when executed by a processor of a computing device, causes the computer device to perform operations comprising:
    receiving an indication that third-party content has been selected by a user of a user device;
    obtaining contact information associated with the user, the contact information being previously stored in a record;
    generating one or more access codes related to the user and the third party, each access code being generated based at least in part on at least a respective portion of the contact information associated with the user;
    transmitting, to a third-party computer associated with a third party that provided the third-party content, the one or more access codes being related to contacting the user, the one or more access codes being different from the contact information associated with the user;
    receiving, from the third-party computer, a contact request comprising at least one access code of the one or more access codes related to contacting the user;
    comparing the at least one access code that was received in the contact request to the one or more access codes related to contacting the user that was stored in the record;
    based at least in part on determining the at least one access code received in the contact request matches the one or more access codes stored in the record, establishing a communication channel for contact between the user device and the third-party computer, the communication channel enabling bi-directional exchanges between the user device and the third-party computer via the computing device, the computing device restricting particular exchanges via the communications channel based at least in part on a set of user-defined restrictions comprising a number of permissible contacts, a duration of permissible contact, or an allowed time-period for permissible contacts; and
    communicating, via the communication channel, with the user device associated with the user on behalf of the third-party computer.

13. The computer-readable storage medium of claim 12, wherein communicating with the user device comprises establishing a telephone connection to the user device.

14. The computer-readable storage medium of claim 12, wherein the computing device performs further operations comprising maintaining, within the record, indications of a plurality of third parties with which the user has granted contact permission.

15. The computer-implemented method of claim 1, further comprising:
    receiving a message for the user, the message being initiated by the third party; and
    forwarding the message for the user based at least in part on restrictions associated with contacting the user.

16. The computer-implemented method of claim 1, wherein managing the communications further comprise refusing one or more contact requests from the third-party computer when the one or more contact requests lack the access code.

17. The computer-implemented method of claim 1, wherein managing the communications comprises delaying an attempt for contact from being transmitted to the user device until a next-available day or time that falls within an allowed range.

18. The service provider computer of claim 5, wherein the one or more access codes comprise a plurality of access codes, and wherein the plurality of access codes are generated to be specific to the respective portion of the contact information, wherein the respective portion of the contact information specific to one of the plurality of access codes differs from the respective portion of the contact information specific to another access code of the plurality of access codes.

19. The service provider computer of claim 18, wherein an order by which the plurality of access codes are received defines a corresponding order with which respective portions of contact information are to be used to attempt user contact.

* * * * *